(12) United States Patent
Vangal et al.

(10) Patent No.: US 7,016,354 B2
(45) Date of Patent: Mar. 21, 2006

(54) PACKET-BASED CLOCK SIGNAL

(75) Inventors: Sriram R. Vangal, Portland, OR (US);
Yatin Hoskote, Portland, OR (US);
Nitin Y. Borkar, Beaverton, OR (US);
Jianping Xu, Portland, OR (US);
Vasantha K. Erraguntla, Beaverton, OR (US); Shekhar Y. Borkar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 386 days.

(21) Appl. No.: 10/234,489

(22) Filed: Sep. 3, 2002

(65) Prior Publication Data

US 2004/0042497 A1 Mar. 4, 2004

(51) Int. Cl.
*H04L 12/56* (2006.01)
(52) U.S. Cl. .................. 370/392; 370/503; 713/501
(58) Field of Classification Search ............... 370/235, 370/463; 712/25; 713/501, 500, 600
See application file for complete search history.

(56) References Cited

U.S. PATENT DOCUMENTS

| | | | | |
|---|---|---|---|---|
| 4,975,929 | A * | 12/1990 | Apple et al. ............... 375/373 |
| 5,602,845 | A * | 2/1997 | Wahl .................... 370/395.7 |
| 6,061,362 | A | 5/2000 | Muller et al. |
| 6,075,392 | A | 6/2000 | Sanders |
| 6,112,309 | A * | 8/2000 | Inoue et al. ............... 713/501 |
| 6,195,353 | B1 * | 2/2001 | Westberg ................ 370/230.1 |
| 6,385,211 | B1 | 5/2002 | Williams et al. |
| 6,434,620 | B1 | 8/2002 | Boucher et al. |
| 6,751,194 | B1 * | 6/2004 | Ueno ...................... 370/235 |
| 2001/0023460 | A1 | 9/2001 | Boucher et al. |
| 2001/0055464 | A1 * | 12/2001 | Miyaki et al. ............. 386/46 |
| 2002/0112143 | A1 * | 8/2002 | Matsuura et al. ............ 712/25 |
| 2002/0172229 | A1 * | 11/2002 | Parvin et al. .............. 370/521 |
| 2004/0039954 | A1 * | 2/2004 | White et al. ............... 713/322 |
| 2004/0042458 | A1 * | 3/2004 | Elzu ...................... 370/394 |
| 2004/0042483 | A1 * | 3/2004 | Elzur et al. ................ 370/463 |

FOREIGN PATENT DOCUMENTS

| | | | |
|---|---|---|---|
| EP | 757495 A1 | * | 2/1997 |
| JP | 09064843 A | | 8/1995 |
| JP | 09064843 A | * | 3/1997 |

OTHER PUBLICATIONS

Requirements for Internet Hosts—Communication Layers, Internet Engineering Task Force, R. Braden, Editor Oct. 1989, 116 pp.
"TCP Extensions for High Performance", V. Jacobson, et al., Cray Research, May 1992, 37 pp.
"Transmission Control Protocol", Darpa Internet Program, Protocol Specification, Sep. 1981, U.S. Appl. No. 09/136, 870, filed: Aug. 19, 1998, 89 pp.
"Accelerating Server and Application Performance", The Next Generation of Network Connectivity, Alacritech 2000, 14 pp.
"An Evaluation of an Attempt at Offloading TCP/IP Protocol Processing Onto an i960RN-Based iNIC".
Boon S. Ang, Computer Systems and Technology Laboratory, Hewlett-Packard Company 2001, 33 pp.

(Continued)

*Primary Examiner*—Steven Nguyen
*Assistant Examiner*—Clemence Han
(74) *Attorney, Agent, or Firm*—Robert A. Greenberg

(57) ABSTRACT

In general, in one aspect, the disclosure describes a method for use in packet processing. The method can include receiving at least a portion of at least one packet and, based on the at least a portion of the at least one packet, determining a clock signal to provide to processing logic that processes the at least one packet.

41 Claims, 16 Drawing Sheets

OTHER PUBLICATIONS

"BCM5700 10/100/1000 PCI-X Controller Software Suite", Product Brief, Broadcom 2000, 2 pp.

"Optistar GE1000 With Transport Acceleration", Lucent Technologies 2001, 2 pp.

"Alacritech 1000×1 Gigabit Adapter", The Accelerating Convergence of Networking and Storage, Alacritech 2002, 2 pp.

"Silverback iSNAP 2100", IP Storage Network Access Processor, Silverback Systems 2002, 2 pp.

"SNP-1000i Dual Port TCP Offload Engine", Trebia Networks, 2002, 2 pp.

"ANA-7711 TC/IP Offload Adapter", Aadaptec, 2 pp.

EZ Chip Technologies, Network Processor Designs for Next Generation Networking Equipment, Dec. 27, 1999, pp. 1-4.

Altera, Increasing System Bandwidth with CDS, Version 1, Jun. 2001, pp. 1-10.

PCT Search Report Dated Oct. 29, 2004.

* cited by examiner

| Instruction | Operands |
|---|---|
| LOAD | regA <-- data |
| MOV | regA --> regB |
| AND / OR | regA regB --> cond |
| ADD / SUB | regA regB --> regC |
| CMP / EQUAL | regA regB --> cond |
| NOT | regA --> regC |
| BREQZ/BRNEQZ/JMP | label |
| SHL2 | regA |
| CAM1CLR | index |
| TCBWR | index |

FIG. 7

PACKET-BASED CLOCK SIGNAL

This application relates to the following co-pending applications: "NETWORK PROTOCOL ENGINE"10/234493; and "TRACKING OUT-OF-ORDER PACKETS"10/234494. These applications were filed on the same day as the present application and name the same inventors.

REFERENCE TO APPENDIX

This application includes an appendix, Appendix A, of micro-code instructions. The authors retain applicable copyright rights in this material.

BACKGROUND

Networks enable computers and other electronic devices to exchange data such as e-mail messages, web pages, audio data, video data, and so forth. Before transmission across a network, data is typically distributed across a collection of packets. A receiver can reassemble the data back into its original form after receiving the packets.

In addition to the data ("payload") being sent, a packet also includes "header" information. A network protocol can define the information stored in the header, the packet's structure, and how processes should handle the packet.

Different network protocols handle different aspects of network communication. Many network communication models organize these protocols into different layers. For example, models such as the Transmission Control Protocol/Internet Protocol (TCP/IP) model and the Open Software Institute (OSI) model define a "physical layer" that handles bit-level transmission over physical media; a "link layer" that handles the low-level details of providing reliable data communication over physical connections; a "network layer", such as the Internet Protocol, that can handle tasks involved in finding a path through a network that connects a source and destination; and a "transport layer" that can coordinate communication between source and destination devices while insulating "application layer" programs from the complexity of network communication.

A different network communication model, the Asynchronous Transfer Mode (ATM) model, is used in ATM networks. The ATM model also defines a physical layer, but defines ATM and ATM Adaption Layer (AAL) layers in place of the network, transport, and application layers of the TCP/IP and OSI models.

Generally, to send data over the network, different headers are generated for the different communication layers. For example, in TCP/IP, a transport layer process generates a transport layer packet (sometimes referred to as a "segment") by adding a transport layer header to a set of data provided by an application; a network layer process then generates a network layer packet (e.g., an IP packet) by adding a network layer header to the transport layer packet; a link layer process then generates a link layer packet (also known as a "frame") by adding a link layer header to the network packet; and so on. This process is known as encapsulation. By analogy, the process of encapsulation is much like stuffing a series of envelopes inside one another.

After the packet(s) travel across the network, the receiver can de-encapsulate the packet(s) (e.g,. "unstuff" the envelopes). For example, the receiver's link layer process can verify the received frame and pass the enclosed network layer packet to the network layer process. The network layer process can use the network header to verify proper delivery of the packet and pass the enclosed transport segment to the transport layer process. Finally, the transport layer process can process the transport packet based on the transport header and pass the resulting data to an application.

As described above, both senders and receivers have quite a bit of processing to do to handle packets. Additionally, network connection speeds continue to increase rapidly. For example, network connections capable of carrying 10-gigabits per second and faster may soon become commonplace. This increase in network connection speeds imposes an important design issue for devices offering such connections. That is, at such speeds, a device may easily become overwhelmed with a deluge of network traffic.

SUMMARY

In general, in one aspect, the disclosure describes a method that includes receiving at least a portion of at least one packet and determining a clock signal to provide to processing logic that processes the at least one packet based on at least one of the packet size and the size of a payload of the packet.

BRIEF DESCRIPTION OF THE DRAWINGS

FIG. 7 is a chart of an instruction set for programming network protocol operations.

DETAILED DESCRIPTION

Network connections continue to increase in speed. For example, connections reaching and exceeding 10 gigabits-per-second may soon become commonplace. To keep up with these speed increases, some systems are being designed to run at increasingly faster clock speeds (e.g., clocks signals having a higher frequency). A clock signal, in part, determines how many things a digital system can get done in a period of time. Unfortunately, running system components with a high frequency clock signal can both consume substantial power and can generate heat that can potentially alter the behavior of temperature sensitive silicon.

Figure 1:
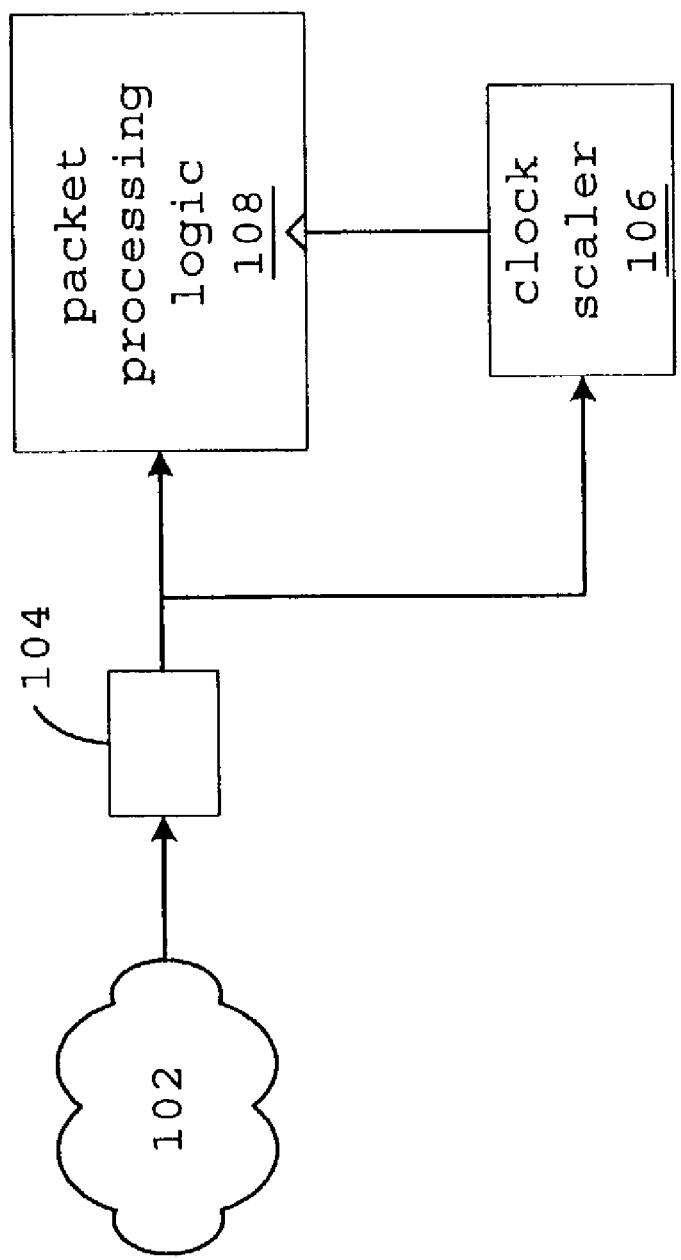
FIG. 1 is a diagram of a system that determines a clock signal based on packet data.

FIG. 1 depicts an approach that adjusts a clock signal provided to packet processing logic 108 based on one or more packet 104 characteristics. By identifying time periods when the clock signal may be slowed (e.g., frequency reduced), the approach can, potentially, save both power and reduce heat generation. Potentially, use of this approach can lessen the need for expensive cooling systems that can occupy valuable device real estate.

In greater detail, FIG. 1 depicts the arrival of a packet 104 over a network 102 connection. Generally, a packet includes payload, the data of interest being sent, and at least one header that describes different packet characteristics. Depending on the network protocols being used, the packet may take a variety of forms such as an IP packet, TCP segment, ATM cell, HDLC (High-Level Data Link Control) frame, protocol data unit fragment, and so forth.

As shown, the packet 104 is processed by packet processing logic 108. The logic 108 may be implemented using a wide variety of techniques such as implementation as an ASIC (Application Specific Integrated Circuit), FPGA (Field Programmable Gate Array), and/or a combination of digital logic gates. Packet processing logic 108 may also be provided by a processor executing packet processing instructions.

As shown, the packet processing logic 108 receives a clock signal from a clock scaler 106. The clock scaler 106 determines the frequency of the clock signal based on data from one or more received packets 104. For example, the clock scaler 106 may use a wide variety of information stored within a packet's 104 header(s) such as packet size, payload size, quality of service, priority, and so forth. Additionally, instead of the characteristics of a single packet, aggregate characteristics may be used to adjust the clock frequency (e.g., average size of packets received).

Figure 2:
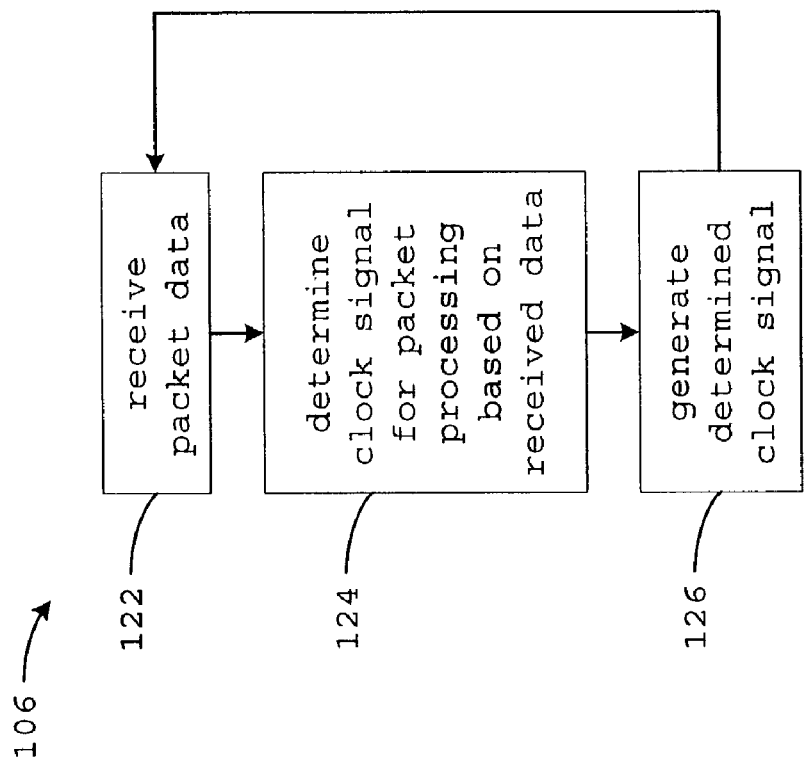
FIG. 2 is a flowchart of a process for determining a clock signal based on packet data.

The determination of a clock signal may be implemented in a wide variety of hardware, firmware, and/or software. For example, a program may be written to implement the process 120 shown in FIG. 2. As shown, after receiving packet data 122, the process 120 can determine 124 a clock signal for packet processing logic and generate the determined 126 clock signal. For example, a program could store a clock signal identifier in a register accessed by a clock signal source.

Figure 3:
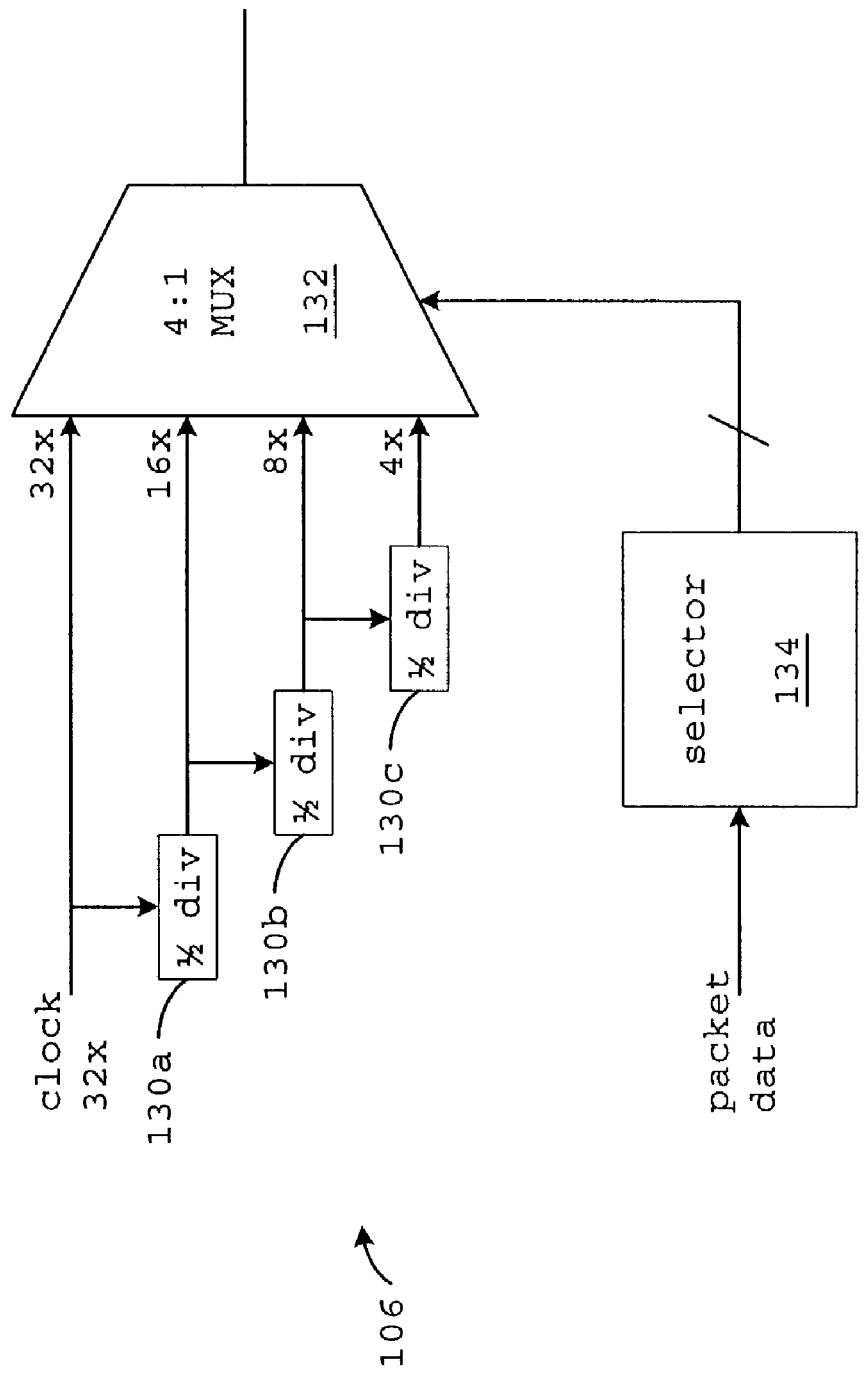
FIG. 3 is a schematic of a mechanism for providing a clock signal based on packet data.

Alternately, as shown in FIG. 3, scaling logic 106 may be implemented in hardware. As shown, the scaling system 106 receives packet data and correspondingly adjusts the frequency of an out-going clock signal. As shown, the scheme uses dividers 130a–130b to offer a range of available frequencies (e.g., 32×, 16×, 8×, and 4×). The different frequency signals are fed into a multiplexer 132 for selection based on one or more packet characteristics. For example, a selector 134 may feature a magnitude comparator that generates a multiplexer 132 selection signal based on a comparison of packet size (or other packet characteristic) to different pre-computed thresholds. For instance, the system 128 may select a frequency of 32× for packets up to 64 bytes in size, a frequency of 16× for packets between 64 and 88 bytes, a frequency of 8× for packet between 88 and 126 bytes, and a frequency of 4× for packets between 126 to 236 bytes. The determination of these example ranges is discussed in greater detail below, however, the basis of frequency selection and the mechanisms used to provide the frequency may vary considerably. Though FIG. 3 illustrated only four different clock signals, other implementations may feature n-clock signals fed into an n:1 multiplexer 132. Additionally, though FIG. 3 depicts a specific hardware configuration, a wide variety of other designs may similarly adjust an output clock signal.

To illustrate one potential application of the frequency scaling technique described above, FIG. 4 depicts an example of a network protocol "off-load" engine 206. Briefly, much in the way a math co-processor can help a Central Processing Unit (CPU) with different computations, an offload engine 206 can at least partially reduce the burden of network communication often placed on a host by performing different network protocol operations. For example, the engine 206 can be configured to perform operations for transport layer protocols (e.g., TCP and User Datagram Protocol (UDP)), network layer protocols (e.g., IP), and application layer protocols (e.g., sockets programming). Similarly, in ATM networks, the engine 206 can be configured to provide ATM layer or AAL layer operations. The engine 206 can also be configured to provide other protocol operations such as those associated with the Internet Control Message Protocol (ICMP).

In addition to conserving host processor resources by handling protocol operations, the engine 206 shown may provide "wire-speed" processing, even for very fast connections such as 10 gigabit per second connections and 40-gigabit per second connections. In other words, the engine 206 may, generally, complete processing of one packet before another arrives. By keeping pace with a high-speed connection, the engine 206 can potentially avoid or reduce the cost and complexity associated with queuing large volumes of backlogged packets.

The sample system 206 shown includes an interface 208 for receiving data traveling between a host and a network 202. For out-going data, the system 206 interface 208 receives data from the host and generates packets for network transmission, for example, via a PHY and medium access control (MAC) device (not shown) offering a network connection (e.g., an Ethernet or wireless connection). For received packets (e.g., arriving via the PHY and MAC), the engine 206 interface 208 can deliver the results of packet processing to the host. For example, the system 206 may communicate with a host via a Small Computer System Interface (SCSI) or Peripheral Component Interconnect (PCI) type bus (e.g., a PCI-X bus system).

In addition to the interface 208, the engine 206 also includes processing logic 210 that implements protocol operations. Like the interface 208, the logic 210 maybe designed using a wide variety of techniques. For example, the logic 210 may be designed as a hard-wired ASIC (Application Specific Integrated Circuit), a FPGA (Field Programmable Gate Array), and/or as another combination of digital logic gates.

As shown, the digital logic 210 may also be implemented by a processor 212 (e.g., a micro-controller or microprocessor) and storage 216 (e.g., ROM (Read-Only Memory) or RAM (Random Access Memory)) for instructions that the processor 212 can execute to perform network protocol operations. The instruction-based engine 206 offers a high degree of flexibility. For example, as a network protocol undergoes changes or is replaced, the engine 206 can be updated by replacing the instructions instead of replacing the engine 206 itself. For example, a host may update the engine 206 by loading instructions into storage 216 from external FLASH memory or ROM on the motherboard, for instance, when the host boots.

Since many instructions may be executed for a given packet, to operate at wire-speed, the engine 206 could be clocked at a very fast frequency far exceeding the frequency needed to keep pace with the network connection. Again, this may lead to a variety of problems including increased power demands and potential heat build-up.

Figure 4:
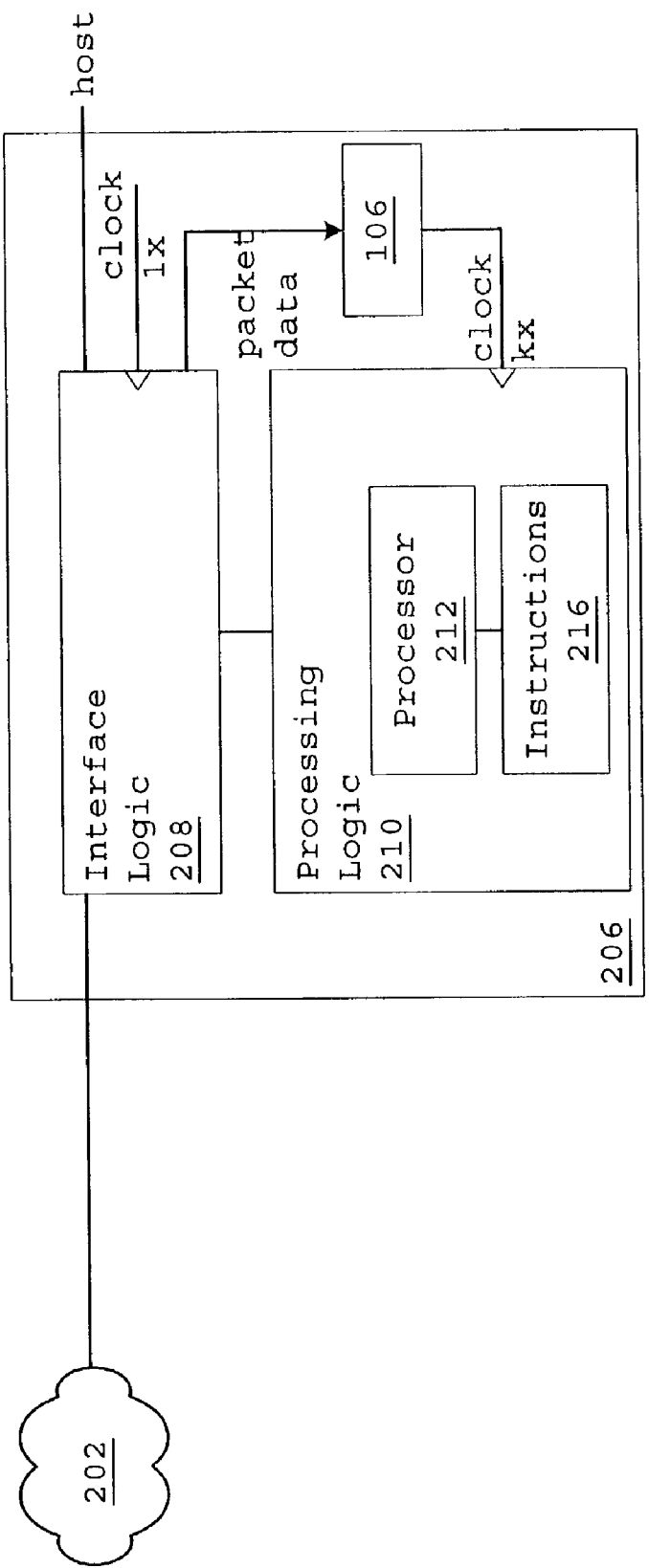
FIG. 4 is a diagram of a network protocol engine featuring a clock signal based on packet data.

As an alternative to a uniform clock signal applied to engine 206 components, FIG. 4 depicts a "multiple-frequency" approach where different engine 206 components are clocked at different frequencies. As an example, different interface 108 components may be clocked at a frequency, "1×", corresponding to the speed of the network connection Since the processing logic 210 may be programmed to execute a number of instructions to perform appropriate network protocol operations for a given packet, different processing logic 210 components may be clocked at a faster frequency than interface 208 components. For example, one or more processing logic 210 components may be clocked at some multiple "k" of the interface 208 clock frequency where "k" is sufficiently high to provide enough time for the processor to finish executing instructions for the packet without falling behind wire speed. It should be noted that not all components within the processing logic 110 and interface 108 blocks need to run at the same clock frequency.

As an example, for an engine 206 having an interface 208 data width of 16-bits, to achieve 10 gigabits per second, the interface 208 should be clocked at a frequency of 625 MHz (e.g., [16-bits per cycle]×[625,000,000 cycles per second]=10,000,000,000 bits per second). Assuming a received packet of 64 bytes (e.g., a packet only having IP and TCP headers, frame check sequence, and hardware source and destination addresses), it would take the 16-bit/625 MHz interface 208 32-cycles to receive the packet bits. Potentially, an inter-packet gap may provide additional time before the next packet arrives. If a set of up to n instructions is used to process the packet and a different instruction can be executed each cycle, the processing block 210 may be clocked at a frequency of k·(625 MHz) where k=n-instructions/32-cycles. For implementation convenience, the value of k may be rounded up to an integer value or a value of $2^n$ though neither of these is a strict requirement.

The above example considered a worst-case scenario (e.g., a very small packet). In practice, however, most packets, nearly 95%, feature larger packet sizes and afford the engine 206 more time for processing. Thus, the engine 206 adjusts 106 a clock signal to provided to processing logic 210 components at frequencies that vary based on one or more packet characteristics. For instance, for a bigger packet, the engine 206 has more time to process the packet before arrival of the next packet, thus, the frequency could be lowered without falling behind wire-speed. Likewise, for a smaller packet, the frequency may be increased. Thus, a clock scaler 106 may receive data identifying a packet's size (e.g., the length field in an IP packet header) and correspondingly scale the clock frequency.

For the sample engine 206 shown, the processing logic clock signal frequency may be determined such that it satisfies the following equation:

[(packet size/data-width)/interface-clock-frequency]
>=(interface-clock-cycles/interface-clock-frequency)+. (maximum number of instructions/processing-clock-frequency).

The processing clock signal frequency may be rounded up to an integer multiple of the interface clock signal frequency or rounded up to an integer multiple of $2^n$, though this is merely an implementation convenience, not a strict necessity.

To save processing time, different processing clock signal frequencies may be pre-computed for different packet characteristics. For example, the scaler 126 may access data identifying a particular clock signal based on a range of packet sizes.

Placing the scaling logic 126 physically near a frequency source can reduce power consumption. Further, adjusting the clock at a global clock distribution point both saves power and reduces logic need to provide clock distribution.

Again, adaptively scaling the clock frequency "on the fly" for different incoming packets can reduce power by reducing operational frequency when processing larger packets. This can, in turn, result in a cooler running system that may avoid the creation of silicon "hot spots" and/or expensive cooling systems.

Figure 5:
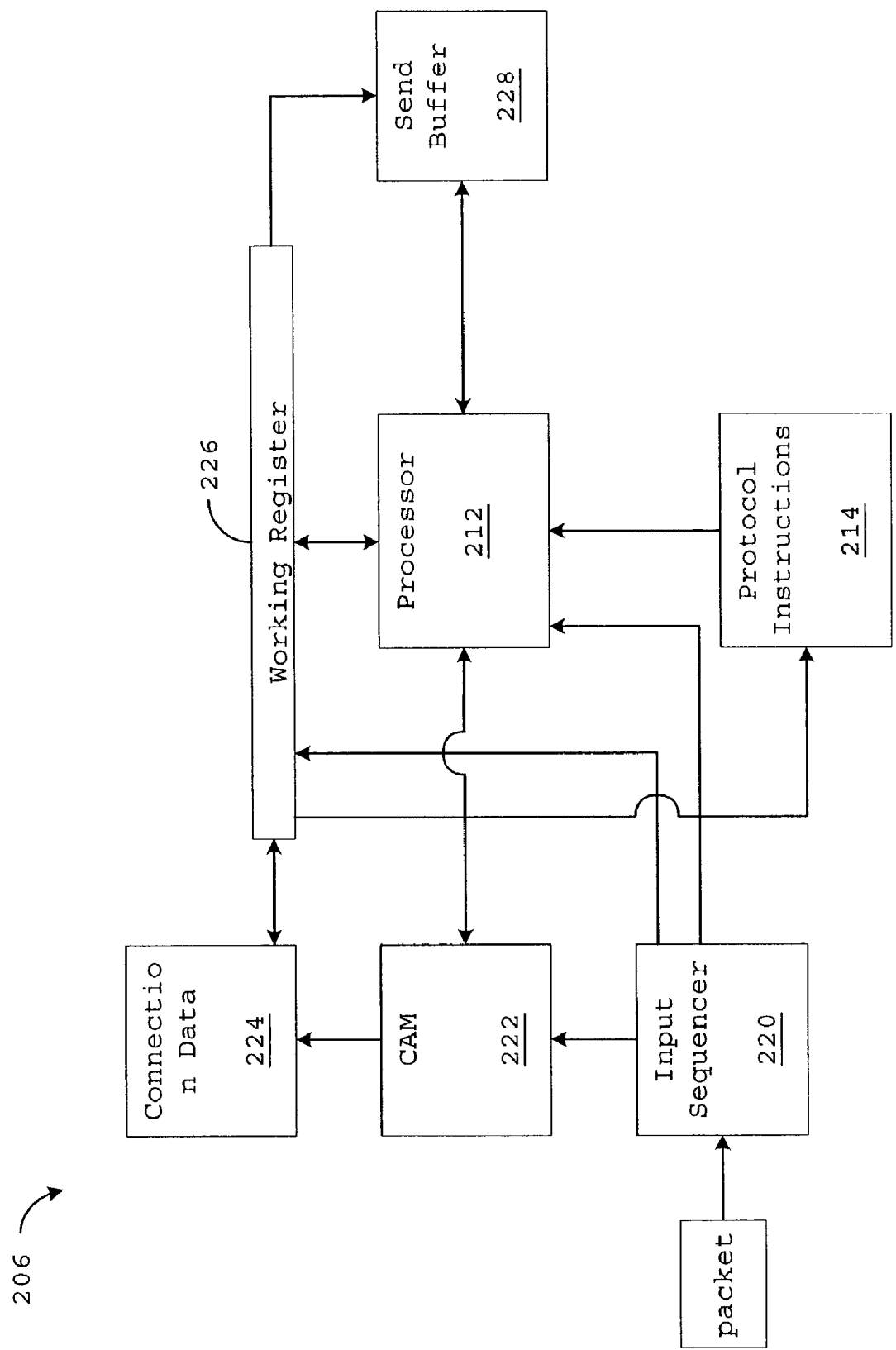
FIG. 5 is a schematic of a network protocol engine.

FIG. 5 depicts a sample implementation of a system 206. As an overview, in this implementation, the system 206 stores context data for different connections in a memory 224. For example, for the TCP protocol, this data is known as TCB (Transmission Control Block) data. For a given packet, the system 206 looks-up the corresponding context data in memory 224 and makes this data available to the processor 212, in this example, via a working register 226. Using the context data, the processor 212 executes an appropriate set of protocol implementation instructions 214. Context data, potentially modified by the processor 212, is then returned to the context data memory 224.

In greater detail, the system 206 shown includes an input sequencer 220 that parses a received packet's header(s) (e.g., the TCP and IP headers of a TCP/IP packet) and temporarily buffers the parsed data. The input sequencer 206 may also initiate storage of the packet's payload in host accessible memory (e.g., via DMA (Direct Memory Access)).

As described above, the system 206 stores context data in memory 224 for different network connections. To quickly retrieve context data 224 for a given packet, the system 206 depicted includes a content-addressable memory 222 (CAM) that stores different connection identifiers (e.g., index numbers) for different connections as identified, for example, by a combination of a packet's IP source and destination addresses and source and destination ports. A CAM can quickly retrieve stored data based on content values much in the way a database can retrieve records based on a key. Thus, based on the packet data parsed by the input sequencer 220, the CAM 222 can quickly retrieve a connection identifier and feed this identifier to the context data memory 224. In turn, the connection data corresponding to the identifier is transferred to the working register 226 for use by the processor 212.

In the case that a packet represents the start of a new connection (e.g., a CAM search for a connection fails), the working register 226 is initialized (e.g., set to the "LISTEN" state in TCP) and CAM 222 and a context data memory 224 entries are allocated for the connection, for example, using a LRU (Least Recently Used) algorithm or other allocation scheme.

The number of data lines connecting different components of the system 206 may be chosen to permit data transfer between connected components 212–228 in a single clock cycle. For example, if the context data for a connection includes n-bits of data, the system 206 may be designed such that the connection data memory 224 may offer n-lines of data to the working register 226.

Thus, the sample implementation shown uses at most three processing cycles to load the working register 226 with connection data: one cycle to query the CAM 222; one cycle to access the connection data 224; and one cycle to load the working register 226. This design can both conserve processing time and economize on power-consuming access to the memory structures 222, 224.

After retrieval of connection data for a packet, the system 206 can perform protocol operations for the packet, for example, by processor 212 execution of protocol implementation instructions stored in memory 216. The processor 212 may be programmed to "idle" when not in use to conserve power. After receiving a "wake" signal (e.g., from the input-sequencer 220 when the connection context is retrieved or being retrieved), the processor 212 may determine the state of the current connection and identify the starting address of instructions for handling this state. The processor 212 then executes the instructions beginning at the starting address. Depending on the instructions, the processor 212 can alter context data (e.g., by altering working register 226), assemble a message in a send buffer 228 for subsequent network transmission, and/or may make processed packet data available to the host (not shown).

Since different components 212–228 may received different clock signals, devices known as "synchronizers" (not shown) may be used to permit communication between the components (e.g., between the connection data memory 224 and the working register 226).

The different clock signals can be routed to different components within the engine 206. For example, while the input sequencer 220 may receive a "1×" clock signal and the processor 212 receives a "k×" clock signal", the connection data memory 224 and CAM 224 may receive the "1×" or the "k×" clock signal, depending on the implementation.

Figure 6:
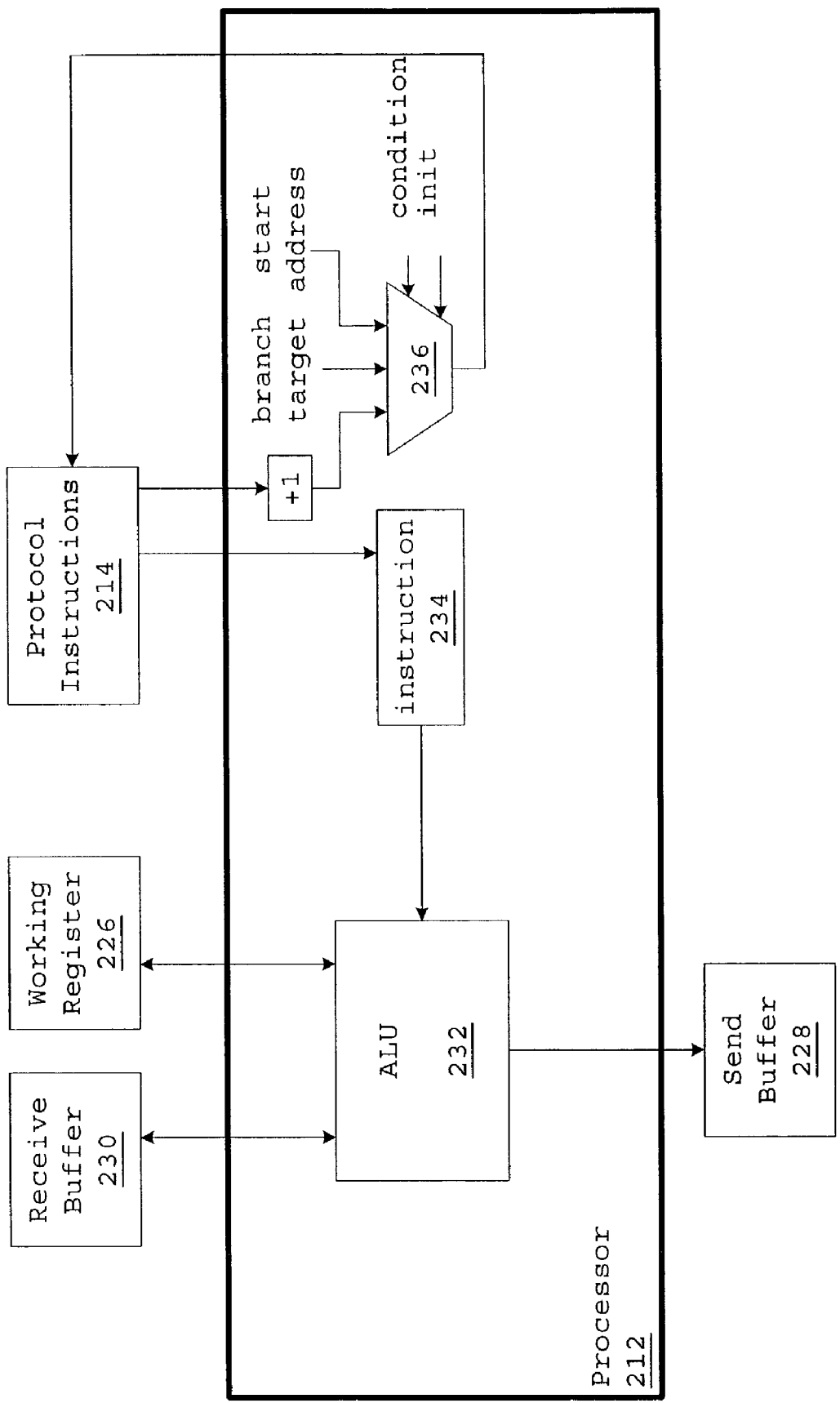
FIG. 6 is a schematic of a processor of network protocol engine.

FIG. 6 depicts the processor 212 in greater detail. As shown, the processor 212 may include an ALU (arithmetic logic unit) 232 that decodes and executes micro-code instructions loaded into an instruction register 234. The instructions 214 may be loaded 236 into the instruction register 234 from memory 214 in sequential succession with exceptions for branching instructions and start address initialization. The instructions 214 may specify access (e.g., read or write access) to a receive buffer 230 that stores the parsed packet data, the working register 226, the send buffer 228, and/or host memory (not shown). The instructions may also specify access to scratch memory, miscellaneous registers (e.g., registers dubbed R0, cond, and statusok), shift registers, and so forth (not shown). For programming convenience, the different fields of the send buffer 228 and working register 226 may be assigned labels for use in the instructions. Additionally, various constants may be defined, for example, for different connection states. For example, "LOAD TCB[state], LISTEN" instructs the processor 212 to change the state of the context currently in the working register 226 to the "LISTEN" state.

FIG. 7 depicts an example of a micro-code instruction set that can be used to program the processor to perform protocol operations. As shown, the instruction set includes operations that move data within the system (e.g., LOAD and MOV), perform mathematic and Boolean operations (e.g., AND, OR, NOT, ADD, SUB), compare data (e.g., CMP and EQUAL), manipulate data (e.g., SHL (shift left)), and provide branching within a program (e.g., BREQZ (conditionally branch if the result of previous operation equals zero), BRNEQZ (conditionally branch if result of previous operation does not equal zero), and JMP (unconditionally jump)).

The instruction set also includes operations specifically tailored for use in implementing protocol operations with engine 206 resources. These instructions include operations for clearing the CAM of an entry for a connection (e.g., CAM1CLR) and for transferring data for a connection between the working register 226 and the connection data storage 224 (e.g., TCBWR). Other implementations may also include instructions that read and write identifier information to the CAM storing data associated with a connection (e.g., CAM1READ key—>index and CAM1WRITE key—>index) and an instruction that reads the connection data 224 (e.g., TCBRD key—>destination). Alternately, these instructions may be implemented as hard-wired digital logic.

Though potentially lacking many instructions offered by traditional general purpose CPUs (e.g., processor 212 may not have instructions for floating-point operations), the instruction set provides developers with easy access to engine 206 resources tailored for network protocol implementation. A programmer may directly program protocol operations using the micro-code instructions. Alternately, the programmer may use a wide variety of code development tools (e.g., a compiler or assembler).

As described above, the engine 206 instructions implement operations for a wide variety of a network protocols. For example, the engine 206 may implement operations for a transport layer protocol such as TCP. A complete specification of TCP and optional extensions can be found in RFCs (Request for Comments) 793, 1122, and 1323.

Briefly, TCP provides connection-oriented services to applications. That is, much like picking up a telephone and assuming the phone company will make everything work, TCP provides applications with simple primitives for establishing a connection (e.g., CONNECT and CLOSE) and transferring data (e.g., SEND and RECEIVE). TCP transparently handles communication issues such as data retransmission, congestion, and flow control.

To provide these services to applications, TCP operates on packets known as segments. A TCP segment includes a TCP header followed by one or more data bytes. A receiver can reassemble the data from received segments. Segments may not arrive at their destination in their proper order, if at all. For example, different segments may travel very paths across the network, Thus, TCP assigns a sequence number to each data byte transmitted. Since every byte is sequenced, each byte can be acknowledged to confirm successful transmission. The acknowledgment mechanism is cumulative so that an acknowledgment of a particular sequence number indicates that bytes up to that sequence number have been successfully delivered.

The sequencing scheme provides TCP with a powerful tool for managing connections. For example, TCP can determine when a sender should retransmit a segment using a technique known as a "sliding window". In the "sliding window" scheme, a sender starts a timer after transmitting a segment. Upon receipt, the receiver sends back an acknowledgment segment having an acknowledgement number equal to the next sequence number the receiver expects to receive. If the sender's timer expires before the acknowledgment of the transmitted bytes arrives, the sender transmits the segment again. The sequencing scheme also enables senders and receivers to dynamically negotiate a window size that regulates the amount of data sent to the receiver based on network performance and the capabilities of the sender and receiver.

In addition to sequencing information, a TCP header includes a collection of flags that enable a sender and receiver to control a connection. These flags include a SYN (synchronize) bit, an ACK (acknowledgement) bit, a FIN (finish) bit, a RST (reset) bit. A message including a SYN bit of "1" and an ACK bit of "0" (a SYN message) represents a request for a connection. A reply message including a SYN bit "1" and an ACK bit of "1" (a SYN+ACK message) represents acceptance of the request. A message including a FIN bit of "1" indicates that the sender seeks to release the connection. Finally, a message with a RST bit of "1" identifies a connection that should be terminated due to problems (e.g., an invalid segment or connection request rejection).

Figure 8:
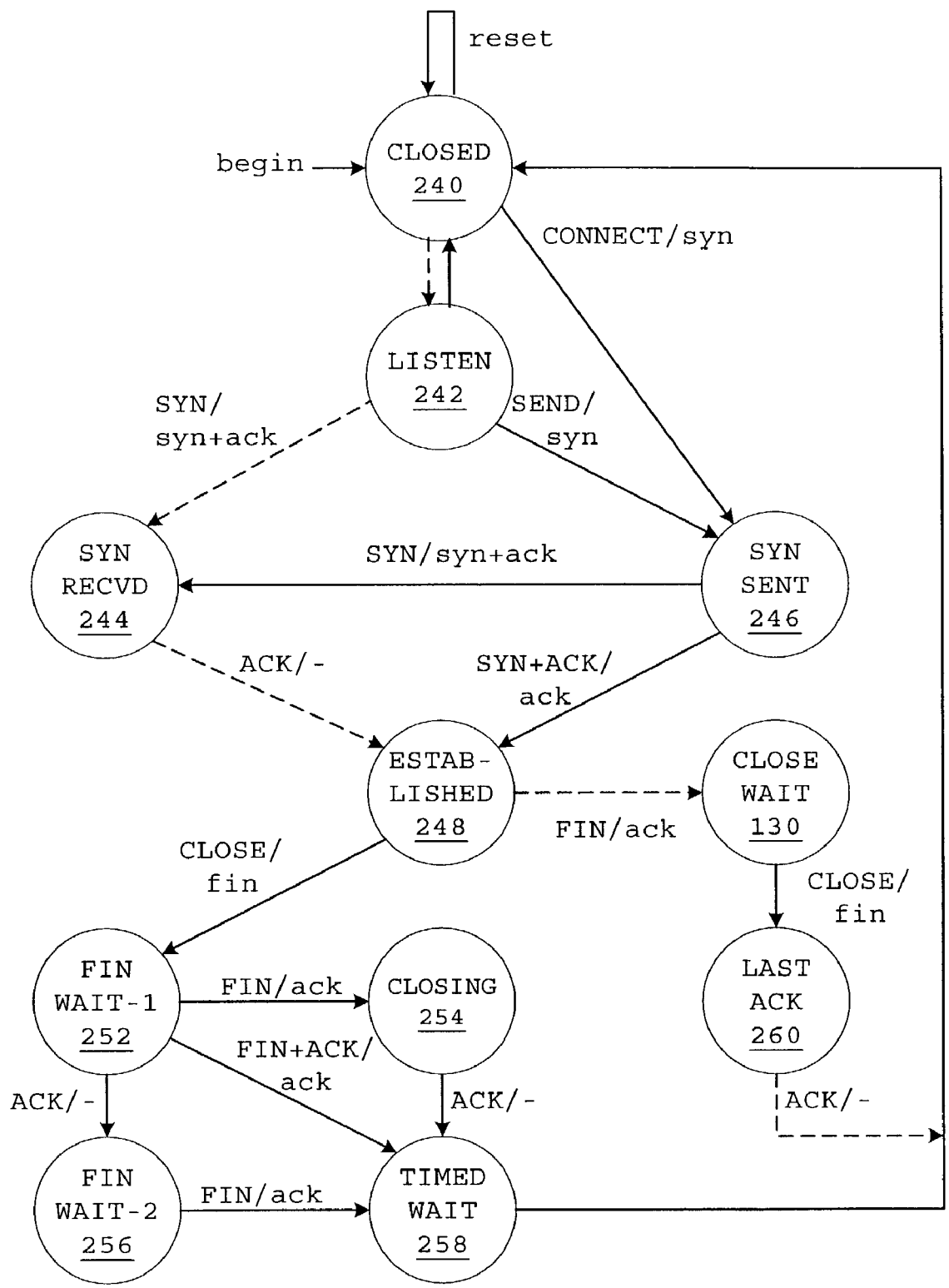
FIG. 8 is a diagram of a TCP (Transmission Control Protocol) state machine.

FIG. 8 depicts a state diagram representing different stages in the establishment and release of a TCP connection. The diagram depicts different states 240–260 and transitions (depicted as arrowed lines) between the states 240–260. The transitions are labeled with corresponding EVENT/action designations that identify an event and response required to move to a subsequent state 240–260. For example, after receiving a SYN message and responding with a SYN+ACK message, a connection moves from the LISTEN state 242 to the SYN RCVD state 244.

In the state diagram of FIG. 8, the typical path for a sender (a TCP entity requesting a connection) is shown with solid transitions while the typical paths for a receiver is shown with dotted line transitions. To illustrate operation of the state machine, a receiver typically begins in the CLOSED state 240 that indicates no connection is currently active or pending. After moving to the LISTEN 242 state to await a connection request, the receiver will receive a SYN message requesting a connection and will acknowledge the SYN message with a SYN+ACK message and enter the SYN RCVD state 244. After receiving acknowledgement of the SYN+ACK message, the connection enters an ESTABLISHED state 248 that corresponds to normal on-going data transfer. The ESTABLISHED state 248 may continue for some time. Eventually, assuming no reset message arrives and no errors occur, the server will receive and acknowledge a FIN message and enter the CLOSE WAIT state 250. After issuing its own FIN and entering the LAST ACK state 260, the server will receive acknowledgment of its FIN and finally return to the original CLOSED 240 state.

Again, the state diagram also manages the state of a TCP sender. The sender and receiver paths share many of the same states described above. However, the sender may also enter a SYN SENT state 246 after requesting a connection, a FIN WAIT 1 state 252 after requesting release of a connection, a FIN WAIT 2 state 256 after receiving an agreement from the server to release a connection, a CLOSING state 254 where both client and server request release simultaneously, and a TIMED WAIT state 258 where previously transmitted connection segments expire.

The engine's 206 protocol instructions may implement many, if not all, of the TCP operations described above and in the RFCs. For example, the instructions may include procedures for option processing, window management, flow control, congestion control, ACK message generation and validation, data segmentation, special flag processing (e.g., setting and reading URGENT and PUSH flags), checksum computation, and so forth. The protocol instructions may also include other operations related to TCP such as security support, random number generation, RDMA (Remote Direct Memory Access) over TCP, and so forth.

In an engine 206 configured to provide TCP operations, the connection data may include 264-bits of information including: 32-bits each for PUSH (identified by the microcode label "TCB[pushseq]"), FIN ("TCB[finseq]"), and URGENT ("TCB[rupseq]") sequence numbers, a next expected segment number ("TCB[mext]"), a sequence number for the currently advertised window ("TCB[cwin]"), a sequence number of the last unacknowledged sequence number ("TCB[suna]"), and a sequence number for the next segment to be next ("TCB[snext]"). The remaining bits store various TCB state flags ("TCB[flags]"), TCP segment code ("TCB[code]"), state ("TCB[tcbstate]"), and error flags ("TCB[error]"), To illustrate an engine 206 programmed to provide TCP configured operations, Appendix A features an example of source micro-code for a TCP receiver. Briefly, the routine TCPRST checks the TCP ACK bit, initializes the send buffer, and initializes the send message ACK number. The routine TCPACKIN processes incoming ACK messages and checks if the ACK is invalid or a duplicate. TCPACKOUT generates ACK messages in response to an incoming message based on received and expected sequence numbers. TCPSEQ determine the first and last sequence number of incoming data, computes the size of incoming data, and checks if the incoming sequence number is valid and lies within a receiving window. TCPINITCB initializes TCB fields in the working register. TCPINITWIN initializes the working register with window information. TCPSENDWIN computes the window length for inclusion in a send message. Finally, TCBDATAPROC checks incoming flags, processes "urgent", "push" and "finish" flags, sets flags in response messages, and forwards data to an application or user.

Another operation performed by the engine 206 may be packet reordering. For example, like many network protocols, TCP does not assume TCP packets ("segments") will arrive in order. To correctly reassemble packets, a receiver can keep track of the last sequence number received and await reception of the byte assigned the next sequence number. Packets arriving out-of-order can be buffered until the intervening bytes arrive. Once the awaited bytes arrive, the next bytes in the sequence can potentially be retrieved quickly from the buffered data.

FIGS. 9–13 illustrate operation of a scheme to track out-of-order packets that can be implemented by the system 206. The scheme permits quick "on-the-fly" ordering of packets without employing a traditional sorting algorithm. As shown, the scheme may be implemented using another set of content-addressable memory, though this is not a requirement. Thus, a system 206 using this technique may include two different sets of content-addressable memory—the content-addressable memory 222 used to retrieve connection context data and the content-addressable memory used to track out-of-order packets. For the purposes of illustration, FIGS. 9–13 are discussed in the context of an implementation of TCP. However, the scheme has wide applicability to a variety of packet re-ordering schemes such as numbered packets (e.g., protocol data unit fragments) and so forth.

Briefly, when a packet arrives, the tracking sub-system 300 determines whether the received packet is in-order. If not, the sub-system 300 consults memory to identify a chain of contiguous, previously received out-of-order packets bordering the newly arrived packet and can modify the data stored in the memory to add the newly received packet to a pre-existing chain. When a packet arrives in-order, the system can access memory to quickly identify a contiguous chain of previously received packets that follow the newly received packet.

Figure 9:
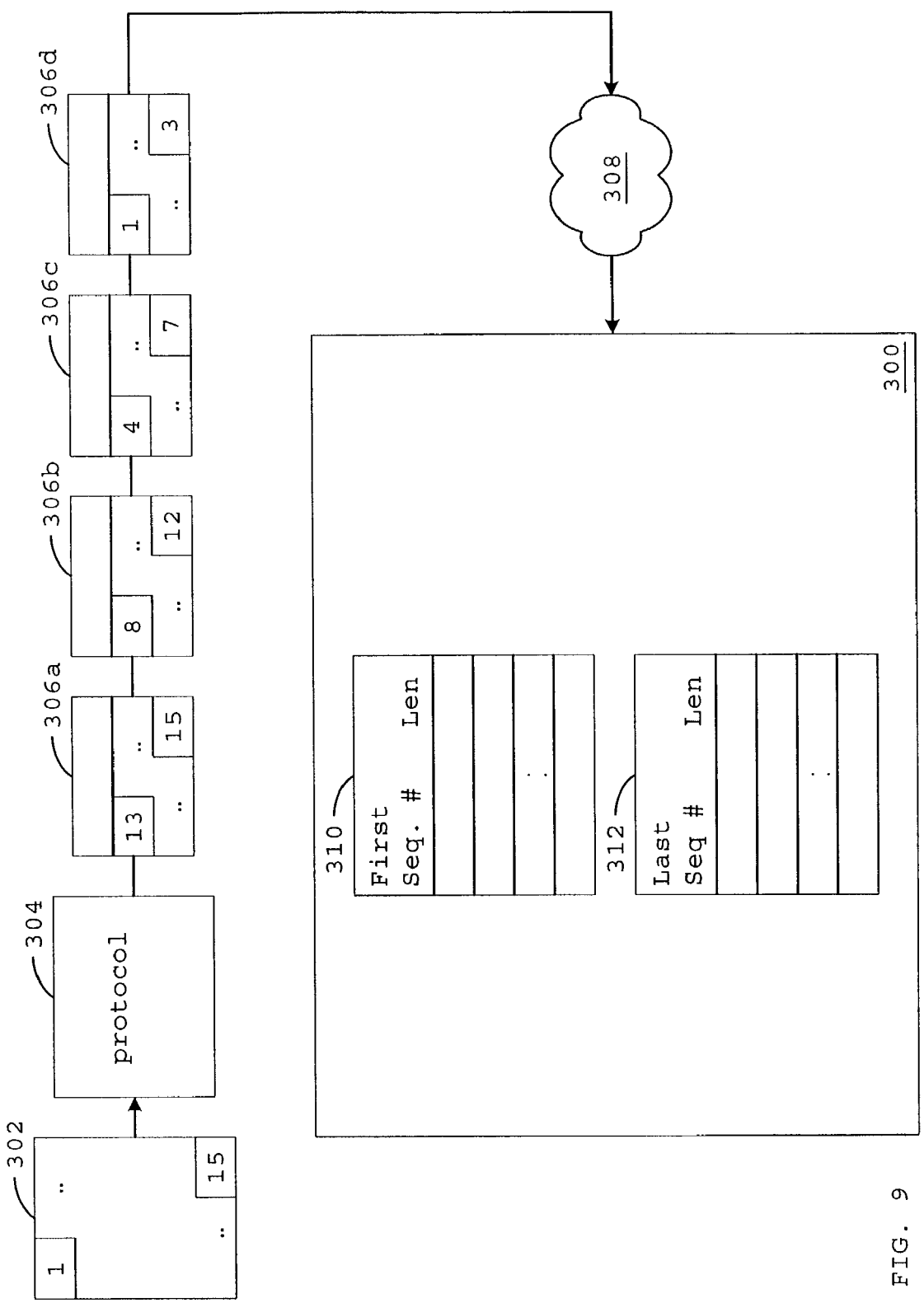
FIGS. 9–13 illustrate operation of a scheme to track out-of-order packets.

In greater detail, as shown in FIG. 9, a protocol 304 (e.g., TCP) divides a set of data 302 into a collection of packets 306a–306d for transmission over a network 308. In the example shown, the 15-bytes of the original set of data 302 are distributed across packets 306a–306d. For example, packet 306d includes bytes assigned sequence numbers "1" to "3".

As shown, the tracking sub-system 300 includes content-addressable memory 310, 312 that stores information about chains of contiguous, out-of-order packets previously received. Memory 310 stores the first sequence number of a contiguous chain of one or more out-of-order packets and the length of the chain. Thus, when a new packet arrives that ends where the pre-existing chain begins, the new packet can be added to the top of the pre-existing chain. Similarly, the memory 312 also stores the end (the last sequence number+1) of a contiguous packet chain of one or more packets and the length of the chain. Thus, when a new packet arrives that begins at the end of a previously existing chain, the new packet can be appended to the end of the previously existing chain to form an even larger chain of contiguous packets. To illustrate these operations, FIGS. 10–13 depict a sample series of operations that occur as the packets 306a–306d arrive.

Figure 10:
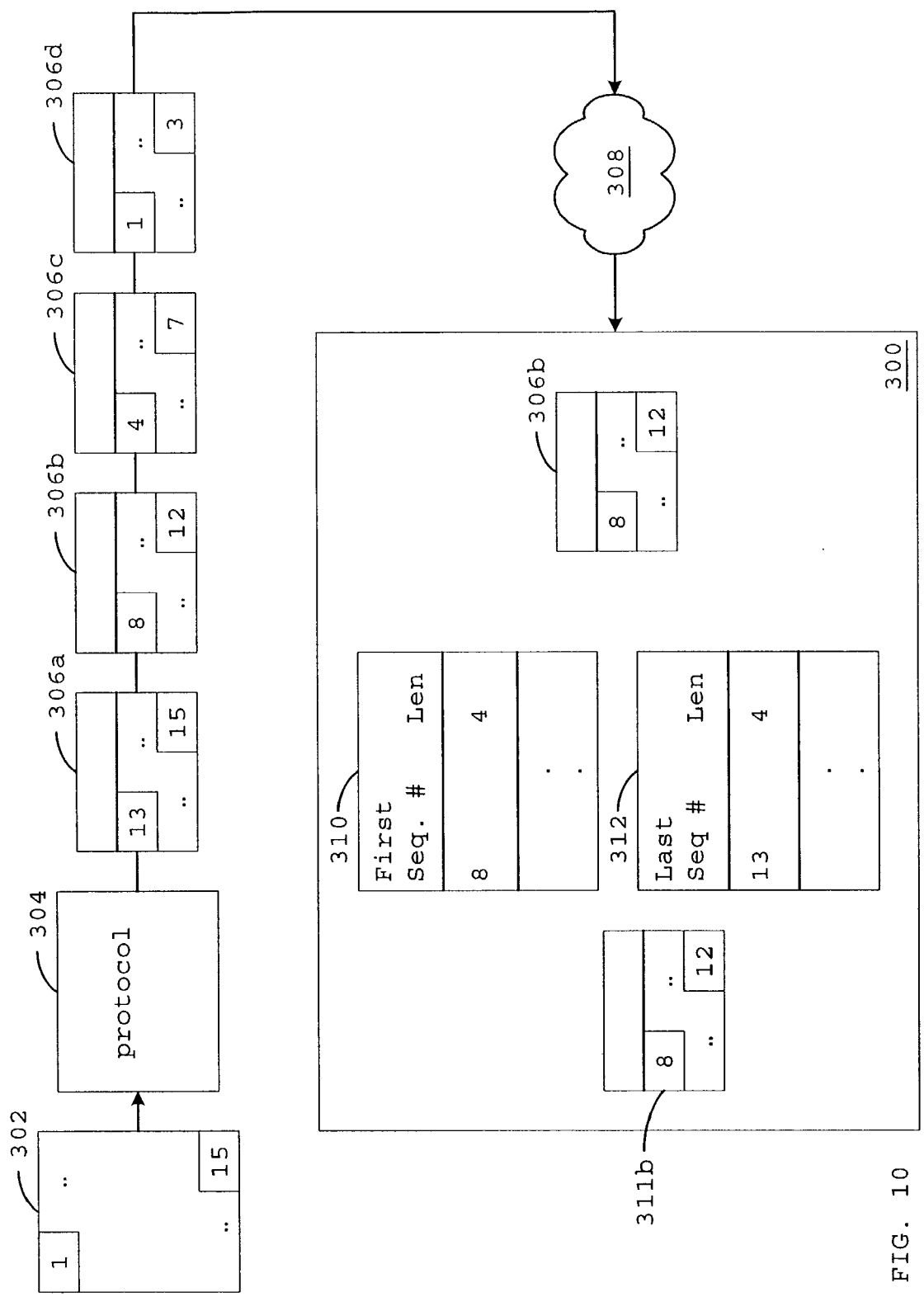

As shown in FIG. 10, packet 306b arrives carrying bytes with sequence numbers "8" through "12". Assuming the receiving device 300 currently awaits sequence number "1", packet 306b has arrived out-of-order. Thus, as shown, the device 300 tracks the out-of-order packet 306b by modifying data stored in its content-addressable memory 310, 312. The packet 306b does not border a previously received packet chain as no chain yet exists in this example. Thus, the device 300 stores the starting sequence number "8" and the number of bytes in the packet "4". The device 300 also stores identification of the end of the packet. In the example shown, the device 300 stores the ending boundary by adding one to the last sequence number of the received packet (e.g., 12+1=13). In addition to modifying or adding entries in the content-addressable memory 310, 312, the device 300 can store the packet or a reference (e.g., a pointer) to the packet 311b to reflect the relative order of the packet. This permits fast retrieval of the packets when finally sent to an application.

Figure 11:
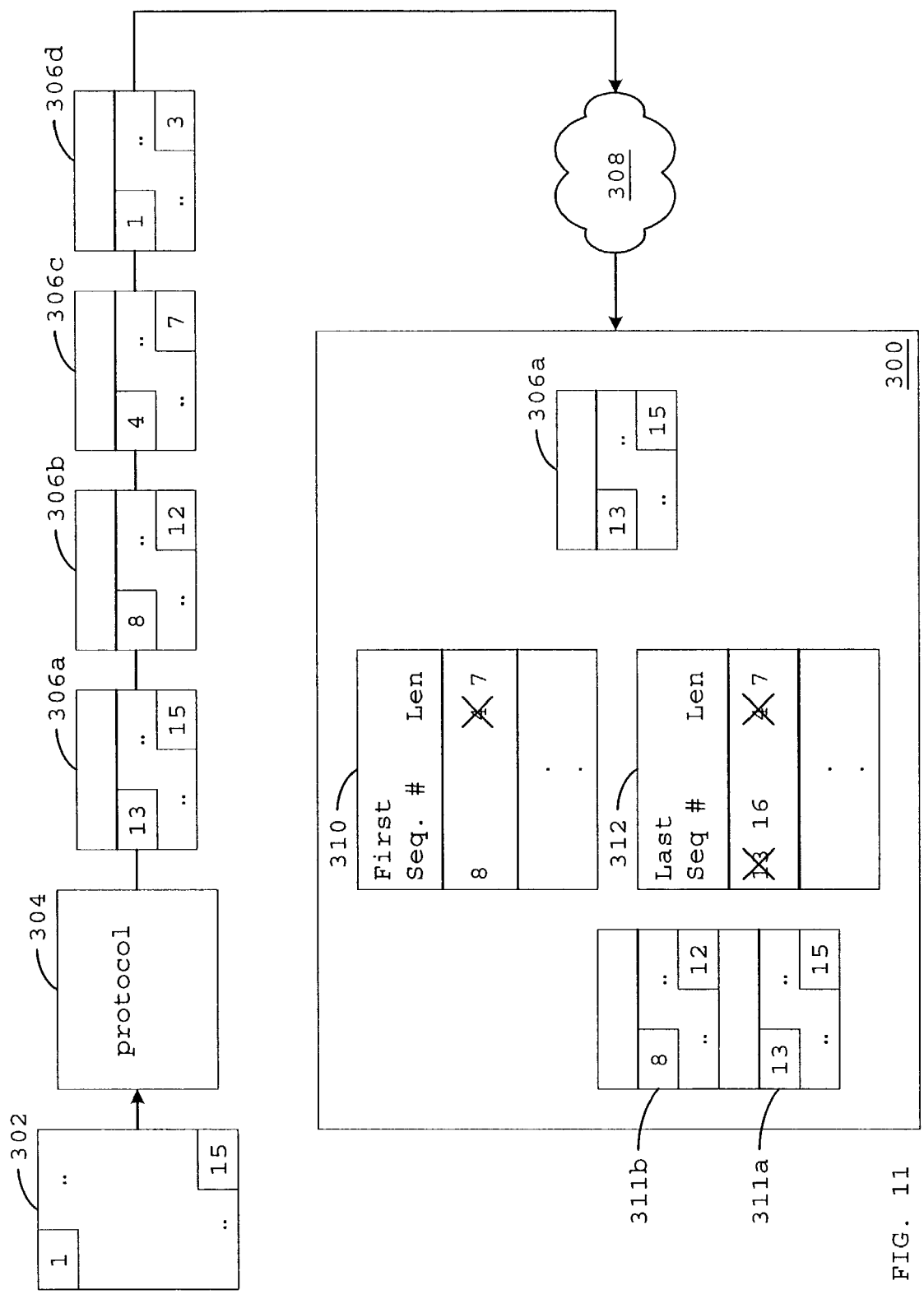

As shown in FIG. 11, the device 300 next receives packet 306a carrying bytes "13" through "15". Again, the device 300 still awaits sequence number "1". Thus, packet 306a has also arrived out-of-order. The device 300 examines memory 310, 312 to determine whether the received packet 306a borders any previously stored packet chains. In this case, the newly arrived packet 306a does not end where a previous chain begins, but does begin where a previous chain ends. In other words, packet 306a borders the "bottom" of packet 306b. As shown, the device 300 can merge the packet 306a into the pre-existing chain in the content-addressable memory data by increasing the length of the chain and modifying its first and last sequence number data accordingly. Thus, the first sequence number of the new chain remains "8" though the length is increased from "4" to "7", while the end sequence number of the chain is increased from "13" to "16" to reflect the bytes of the newly received packet 306a. The device 300 also stores the new packet 311a or a reference to the new packet to reflect the relative ordering of the packet.

Figure 12:
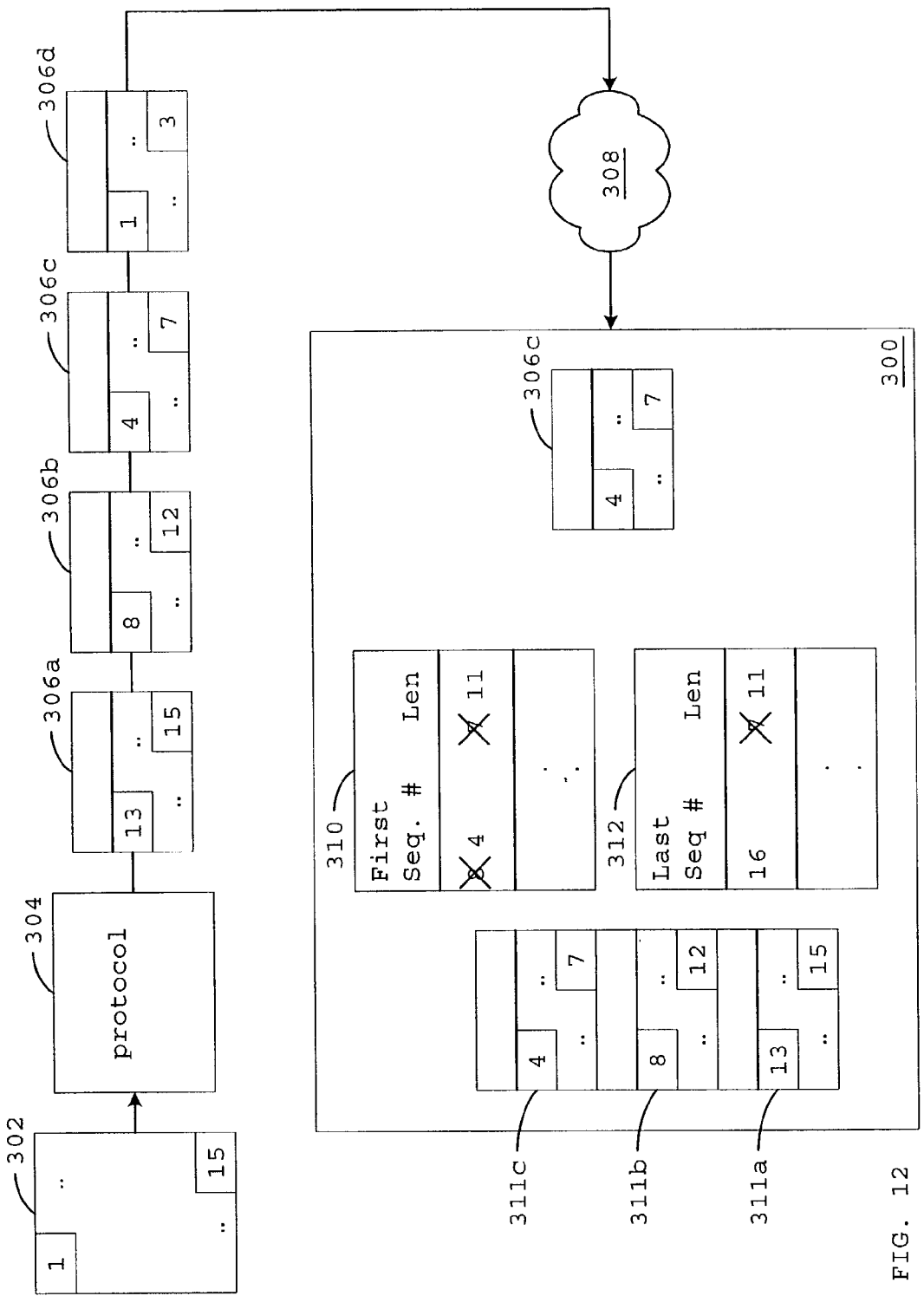

As shown in FIG. 12, the device 300 next receives packet 306c carrying bytes "4" to "7". Since this packet 306c does not include the next expected sequence number, "1", the device 300 repeats the process outlined above. That is, the device 300 determines that the newly received packet 306c fits "atop" the packet chain spanning packets 306b, 306a. Thus, the device 300 modifies the data stored in the content-addressable memory 310, 312 to include a new starting sequence number for the chain, "4", and a new length data for the chain, "11". The device 300 again stores the packet 311c data or a reference to reflect the packets 310c relative ordering.

Figure 13:
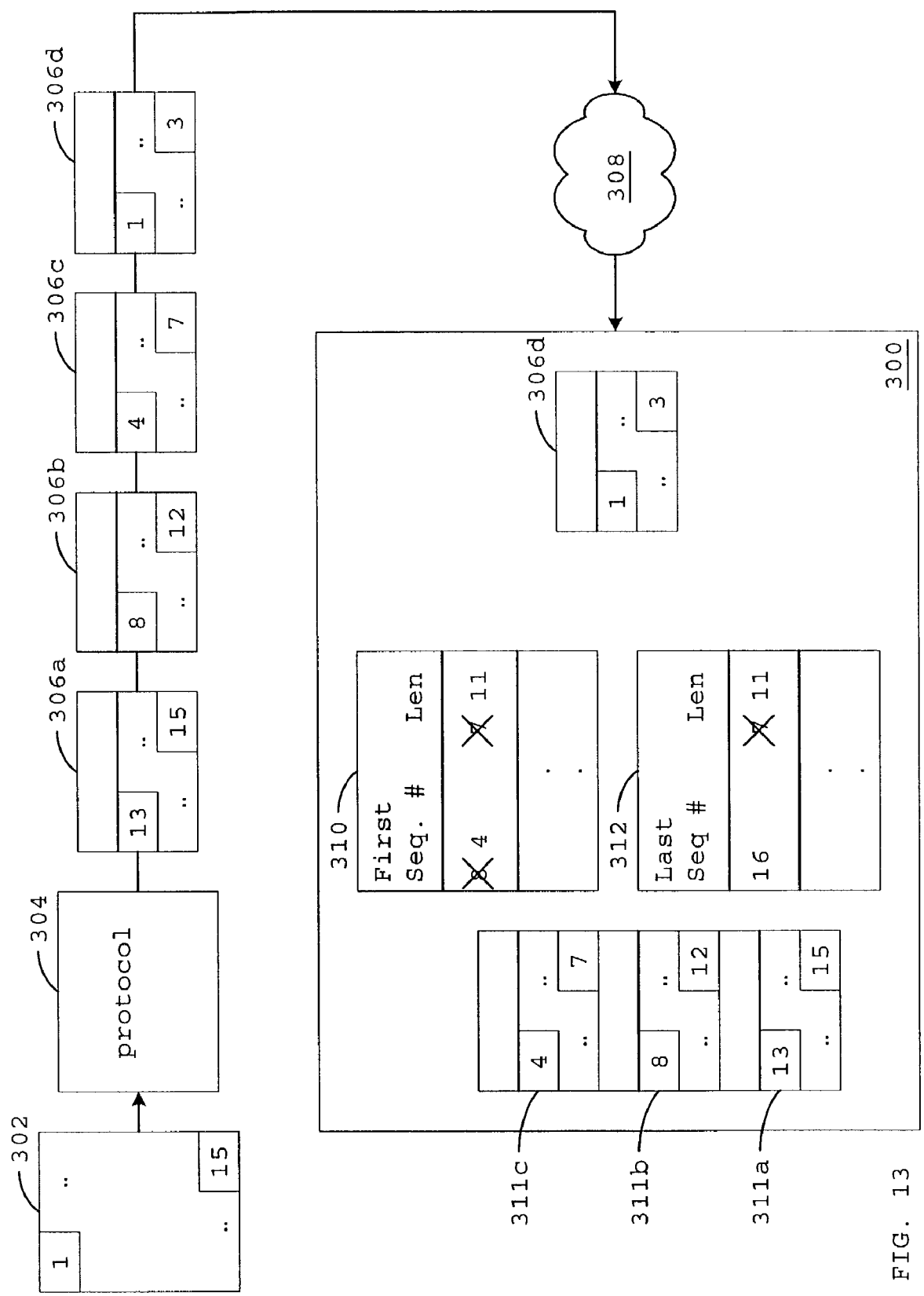

As shown in FIG. 13, the device 300 finally receives packet 306d that includes the next expected sequence number, "1". The device 300 can immediately transfer this packet 306d to an application. The device 300 can also examine its content-addressable memory 310 to see if other packet chains can also be sent to the application. In this case, the received packet 306d borders a packet chain that already spans packets 306a–306c. Thus, the device 300 can immediately forward the data of chained packets to the application in the correct order.

The sample series shown in FIGS. 9–13 highlights several aspects of the scheme. First, the scheme may prevent out-of-order packets from being dropped and being retransmitted by the sender. This can improve overall throughput. The scheme also uses very few content-addressable memory operations to handle out-of-order packets, saving both time and power. Further, when a packet arrives in the correct order, a single content-addressable memory operation can identify a series of contiguous packets that can also be sent to the application.

Figure 14:
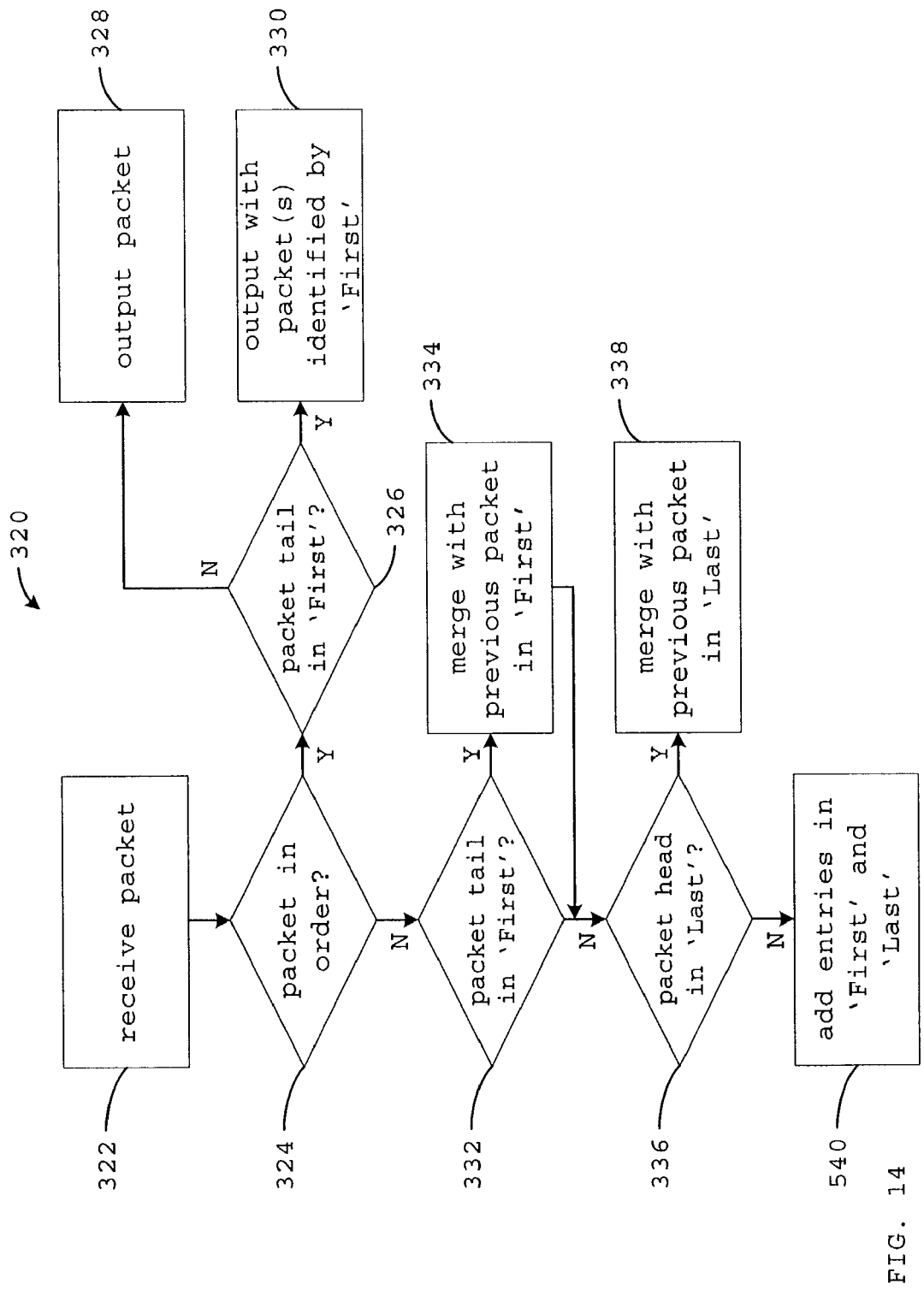
FIG. 14 is a flowchart of a process to track out-of-order packets.

FIG. 14 depicts a flowchart of a process 320 for implementing the scheme illustrated above. As shown, after receiving 322 a packet, the process 320 determines 324 whether the packet is in order (e.g., whether the packet includes the next expected sequence number or next expected packet number). If not, the process 320 determines 332 whether the end of the received packet borders the start of an existing packet chain. If so, the process 320 can modify 334 the data stored in content-addressable memory to reflect the larger, merged packet chain starting at the received packet and ending at the end of the previously existing packet chain. The process 320 also determines 336 whether the start of the received packet borders the end of an existing packet chain. If so, the process 320 can modify 338 the data stored in content-addressable memory to reflect the larger, merged packet chain ending with the received packet.

Potentially, the received packet may border pre-existing packet chains on both sides. In other words, the newly received packet fills a hole between two chains. Since the process 320 checks both starting 332 and ending 336 borders of the received packet, a newly received packet may cause the process 320 to join two different chains together into a single monolithic chain.

As shown, if the received packet does not border a packet chain, the process 320 stores 340 data in content-addressable memory for a new packet chain that, at least initially, includes only the received packet.

If the received packet is in order, the process 320 can query 326 the content-addressable memory to identify a bordering packet chain following the received packet. If such a chain exists, the process 320 can output the newly received packet to an application along with the data of other packets in the adjoining packet chain.

Figure 15:
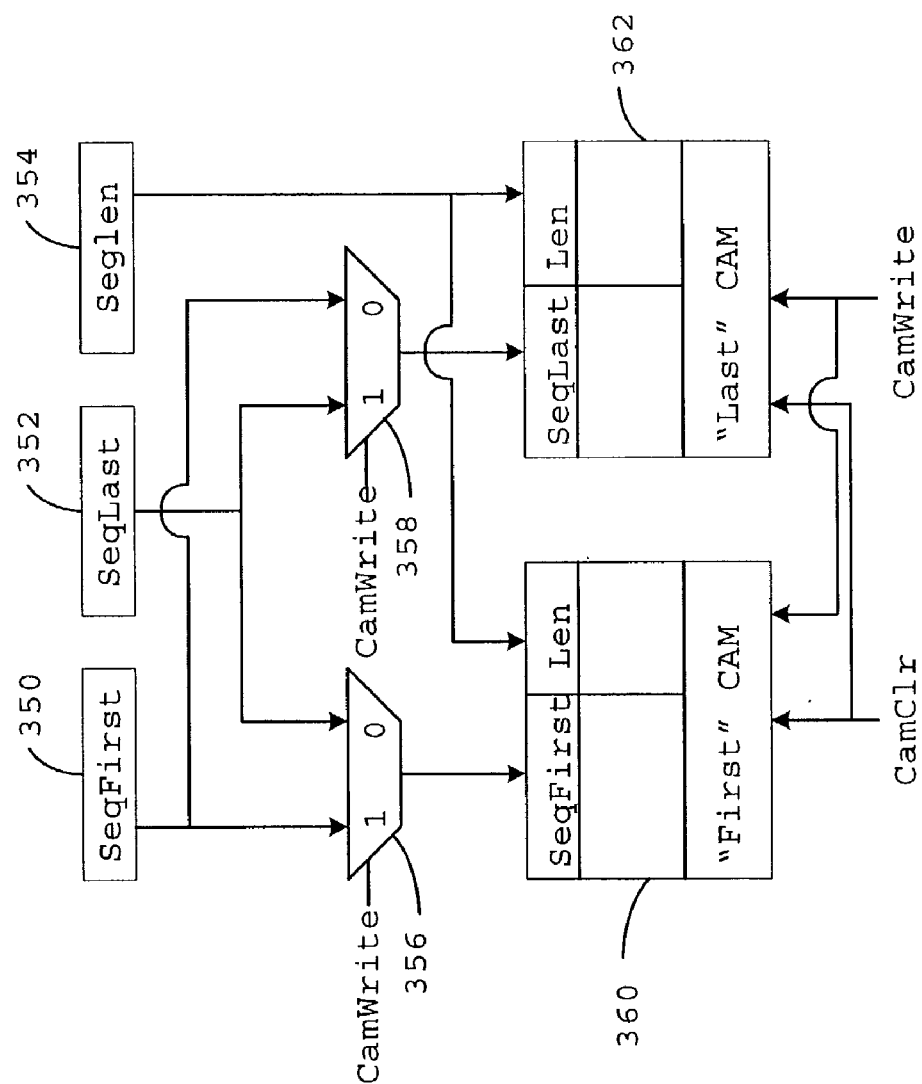
FIGS. 15–16 are schematics of a system to track out-of-order packets that includes content-addressable memory.
Figure 16:
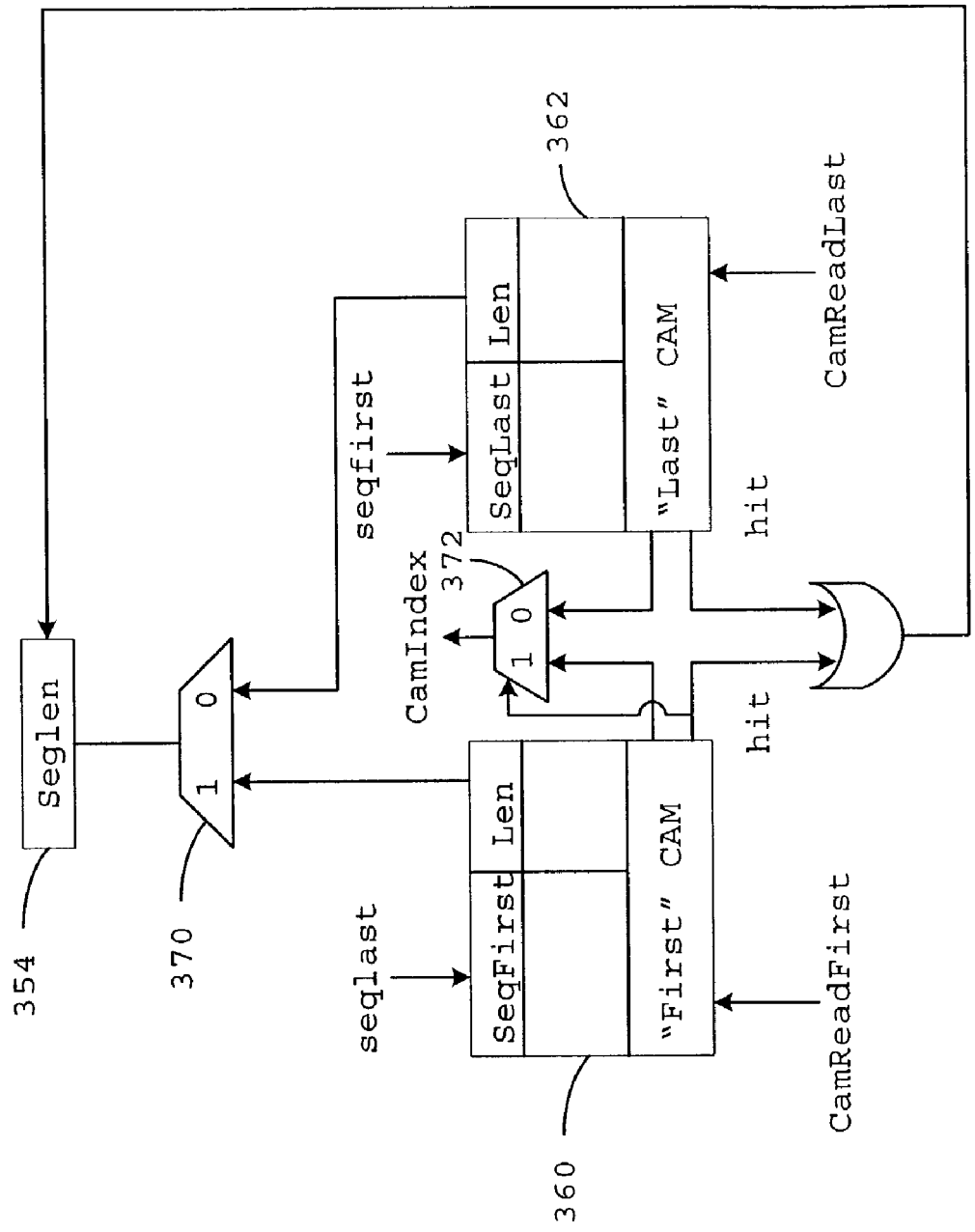

This process may be implemented using a wide variety of hardware, firmware, and/or software. For example, FIGS. 15 and 16 depict a hardware implementation. As shown in these figures, the implementation features two content-addressable memories 360, 362—one 360 stores the first sequence number of an out-of-order packet chain as the key and the other 362 stores the last+1 sequence number of the chain as the key. As shown, both CAMs 360, 362 also store the length of chain. Other implementations may use a single CAM or may use other data storage techniques.

Potentially, the same CAM(s) can be used to track packets of many different connections. In such cases, a connection ID may be appended to each CAM entry as part of the key to distinguish entries for different connections. The merging of packet information in the CAM permits the handling of more connections with smaller CAMs.

As shown in FIG. 15, the implementation includes registers that store a starting sequence number 350, ending sequence number 352, and a data length 354. The processor 212 shown in FIG. 4 may access these registers 350, 352, 354 to load packet data to tracking sub-system 300. The processor 212 may also request a next expected sequence number to include in an acknowledgement message sent back to the sender.

As shown, the implementation operates on control signals for reading from the CAM(s) 360, 362 (CAMREAD), writing to the CAMs 360, 362 (CAMWRITE), and clearing a CAM 360, 362 entry (CAMCLR). As shown in FIG. 15, the hardware may be configured to simultaneously write register values to both CAMs 360, 362 when the registers 350, 352, 354 are loaded with data. As shown in FIG. 16, for "hits" for a given start or end sequence number, the circuitry sets the "seglen" register to the length of a matching CAM entry. Circuitry (not shown) may also set the values of the "seqfirst" 350 and "seqlast" 352 registers after a successful CAM 360, 362 read operation. The circuitry may also provide a "CamIndex" signal that identifies a particular "hit" entry in the CAM(s) 360, 362.

The sub-system 300 may feature additional circuitry (not shown) for implementing the process described above. For example, the sub-system may feature its own independent controller or digital logic gates that execute instructions implementing the tracking scheme. Alternately, the processor 212 may include instructions for the scheme. Potentially, the processor 212 instruction set (FIG. 7) may be expanded to include commands that access the re-ordering CAMs 360, 362. Such instructions may include instructions to write data to the re-ordering CAM(s) 360, 362 (e.g., CAM2FirstWR key<— data for CAM 310 and CAM2LastWR key<—data for CAM 312); instructions to read data from the CAM(s) (e.g., CAM2FirstRD key—>data and CAM2LastRD key—>data); instructions to clear CAM entries (e.g., CAM2CLR index), and/or instructions to generates a condition value if a lookup failed (e.g., CAM2EMPTY—>cond).

Again, a wide variety of implementations may use one or more of the techniques described above. For example, the clock scaler 126 may be designed to provide a clock signal to components within a chip, chipset, or motherboard. Further, the scaler 106 may be integrated into components such as a network adaptor, NIC (Network Interface Card), or MAC (medium access control) device. Potentially, the techniques described herein may also be used within a microprocessor.

Aspects of techniques described herein may be implemented using a wide variety of hardware and/or software configurations. For example, the techniques may be implemented in computer programs. Such programs may be stored on computer readable media and include instructions for programming a processor.

Other embodiments are within the scope of the following claims.

What is claimed is:

1. A method for use in packet processing, the method comprising:
   receiving at least a portion of at least one packet; and
   determining a clock signal to provide to processing logic that processes the at least one packet based on a size of at least one of the following: the at least one packet and a payload of the at least one packet, wherein the determining the clock signal comprises determining the clock signal based on data included in a header of the at least one packet.

2. The method of claim 1, wherein the data included in the header comprises a length field in the packet header.

3. The method of claim 1 wherein the determining the clock signal comprises determining such that a larger size corresponds to a lower frequency clock signal.

4. The method of claim 1, wherein the determining the clock signal comprises accessing data identifying different clock signals for different sets of multiple sizes.

5. The method of claim 1, wherein the determining the clock signal comprises determining a clock signal based on a number of processing cycles the processing logic uses to process the packet.

6. The method of claim 1, wherein the determining the clock signal comprises determining based on at least one of the following: an indicator of quality of service and an indicator of priority.

7. The method of claim 1, further comprising feeding a selection signal corresponding to the determined clock signal to a multiplexer.

8. The method of claim 1, further comprising providing the determined clock signal.

9. The method of claim 1, further comprising: receiving at least a portion of the at least one packet at an interface clocked at a first clock frequency; and
   wherein determining the clock signal comprises determining a clock signal that differs from the first clock frequency.

10. The method of claim 9, wherein the first clock frequency comprises a frequency corresponding to a 10 gigabit-per-second connection.

11. The method of claim 9, wherein the determined clock signal is at a frequency that is an integral multiple of the first clock frequency.

12. The method of claim 1, wherein the processing logic comprises a network protocol off-load engine.

13. The method of claim 12, wherein the network protocol off-load engine comprises an arithmetic logic unit and at least one memory that stores arithmetic logic unit instructions.

14. A computer program product, disposed on a computer readable medium, the program including instructions for causing a processor to:
   receive at least a portion of at least one packet; and
   determine a clock signal to provide to processing logic that processes the at least one packet based on a size of at least one of the following: the at least one packet and a payload of the at least one packet, wherein the instructions that cause the processor to determine the clock signal comprise instructions that cause the processor to determine the clock signal based on data included in a header of the at least one packet.

15. The program of claim 14, wherein the data included in the header comprises a length field in the packet header.

16. The program of claim 14, wherein the instructions that cause the processor to determine the clock signal comprise instructions that cause the processor to determine the clock signal such that a larger size corresponds to a lower frequency clock signal.

17. The program of claim 16, wherein the instructions that cause the processor to determine the clock signal comprise instructions that cause the processor to access data identifying different clock signals for different sets of multiple sizes.

18. The program of claim 14, wherein the instructions that cause the processor to determine a clock signal comprise instructions that cause the processor to determine a clock signal based on a number of processing cycles the processing logic uses to process the packet.

19. The program of claim 18, wherein the instructions that cause the processor to determine the clock signal comprise instructions that cause the processor to determine a clock signal that has a different frequency than a clock signal provided to an interface that receives packet bits.

20. The program of claim 19, wherein the determined clock signal is at a frequency that is an integral multiple of the clock signal frequency provided to the interface that receives packet bits.

21. The program of claim 14, wherein the instructions that cause the processor to determine a clock signal comprise instructions that cause the processor to determine the clock signal based on at least one of the following: an indicator of quality of service and an indicator of priority.

22. The program of claim 14, wherein the processing logic comprises a network protocol off-load engine.

23. A system comprising:
a first set of digital logic to receive at least a portion of at least one packet; and
a second set of digital logic to determine a clock signal to provide to processing logic that processes the at least one packet based on a size of at least one of the following: the at least one packet and a payload of the at least one packet, wherein the second set of digital logic to determine the clock signal comprises digital logic to determine the clock signal based on data included in a packet header.

24. The system of claim 23, wherein the data included in the header comprises a length field in the packet header.

25. The system of claim 23 wherein the second set of digital logic to determine the clock signal comprise digital logic to determine the clock signal such that a larger size corresponds to a lower frequency clock signal.

26. The system of claim 23, wherein the second set of digital logic to determine the clock signal comprises digital logic to access data identifying different clock signals for different sets of one or more multiple sizes.

27. The system of claim 23, wherein the second set of digital logic to determine the clock signal comprises digital logic to determine a clock signal based on a number of processing cycles the processing logic uses to process the packet.

28. The system of claim 23, wherein the second set of digital logic to determine the clock signal comprises digital logic to determine the clock signal based on at least one of the following: an indicator of quality of service and an indicator of priority.

29. The system of claim 23, the second set of digital logic comprises digital logic to feed a selection signal corresponding to the determined clock signal to a multiplexer.

30. The system of claim 23, wherein the second set of digital logic further comprises digital logic to provide the determined clock signal.

31. The system of claim 23, wherein the second set of digital logic comprises logic to access data identifying a clock signal frequency for a packet characteristic.

32. The system of claim 23, further comprising:
wherein the first set of digital logic is clocked at a first clock frequency; and
wherein the second set of digital logic to determine the clock signal comprises digital logic to determine a clock signal that differs from the first clock frequency.

33. The system of claim 32, wherein the first clock frequency comprises a frequency corresponding to a 10 gigabit-per-second connection.

34. The system of claim 33, wherein the determined clock signal is at a frequency that is an integral multiple of the first clock frequency.

35. The system of claim 23, wherein the processing logic comprises a network protocol off-load engine.

36. A system comprising:
at least one host processor;
an Ethernet medium access control (MAC) device;
at least one TCP (Transmission Control Protocol) off-load engine to receive at least a portion of a packet received by the MAC device and process the packet for the at least one host, the engine being coupled to the host via a bus; and
digital logic to determine a clock signal to provide to at least part of the TCP off-load engine based on a size of at least one of the following: the at least one packet and a payload of the at least one packet, wherein the digital logic to determine the clock signal comprises digital logic to determine the clock signal based on data included in an Internet Protocol header of the packet.

37. The system of claim 36, wherein the at least one host comprises a local, general purpose Central Processing Unit (CPU).

38. The system of claim 36 wherein the data comprises a packet length field in the Internet Protocol packet header.

39. The system of claim 36, wherein the off-load engine comprises a first set of one or more content-addressable memories to store data for different TCP connections and a second set of one or more content-addressable memories to store data for TCP packets received out-of-order.

40. The system of claim 36, wherein the digital logic comprises:
a magnitude comparator fed data representing at least one characteristic of at least one packet; and
a multiplexer coupled to the magnitude comparator and fed a collection of clock-signals having different frequencies, the signal from the magnitude collector selecting the clock signal output by the multiplexer.

41. The system of claim 36 wherein the digital logic comprises a part of the TCP off-load engine.

* * * * *

UNITED STATES PATENT AND TRADEMARK OFFICE
CERTIFICATE OF CORRECTION

PATENT NO. : 7,016,354 B2 Page 1 of 1
APPLICATION NO. : 10/234489
DATED : March 21, 2006
INVENTOR(S) : Vangal et al.

It is certified that error appears in the above-identified patent and that said Letters Patent is hereby corrected as shown below:

In column 5, at line 48, delete ".".
In column 15, at line 32, delete "one or more".

Signed and Sealed this

Sixth Day of November, 2007

JON W. DUDAS
*Director of the United States Patent and Trademark Office*